United States Patent [19]
Lodjic

[11] 3,843,987
[45] Oct. 29, 1974

[54] CONTOUR ADAPTED PASSENGER LOADING RAMP

[75] Inventor: Carl L. Lodjic, Long Beach, Calif.
[73] Assignee: Global Erectors, Inc., Long Beach, Calif.
[22] Filed: Mar. 28, 1973
[21] Appl. No.: 345,761

[52] U.S. Cl. ................................. 14/71
[51] Int. Cl. ........................... B65g 11/00
[58] Field of Search ................ 14/71, 72; 135/5 A

[56] References Cited
UNITED STATES PATENTS

| | | | |
|---|---|---|---|
| 2,602,944 | 7/1952 | Richardson | 14/71 |
| 3,099,847 | 8/1963 | Lodjic | 14/71 |
| 3,310,823 | 3/1967 | Preiss | 14/71 |
| 3,363,273 | 1/1968 | Chitwood | 14/71 |
| 3,369,264 | 2/1968 | Kurka | 14/71 |
| 3,484,883 | 12/1969 | Van Marle | 14/71 |
| 3,581,331 | 6/1971 | Fisher | 14/71 |
| 3,641,604 | 2/1972 | Eggert | 14/71 |

Primary Examiner—Nile C. Byers, Jr.
Attorney, Agent, or Firm—Fulwider, Patton, Rieber, Lee & Utecht

[57] ABSTRACT

The contour adapted passenger loading ramp of the present invention includes, generally, a tunnel defining a walk-way leading to a loading area for receiving a plurality of different models of aircraft having various longitudinal contours. The tunnel terminates at its outer extremity in an access opening having a canopy thereover which is selectively extendable to have its roof engaged with the aircraft fuselage and a contour adaptor is mounted from such fuselage and includes a cover plate pivotally mounted from the canopy and having its free end selectively extendable to accommodate various degrees of fuselage curvature to mate with such fuselage and maintain a continuous ramp roof from the airplane terminal to the entry way to the airplane itself.

7 Claims, 9 Drawing Figures

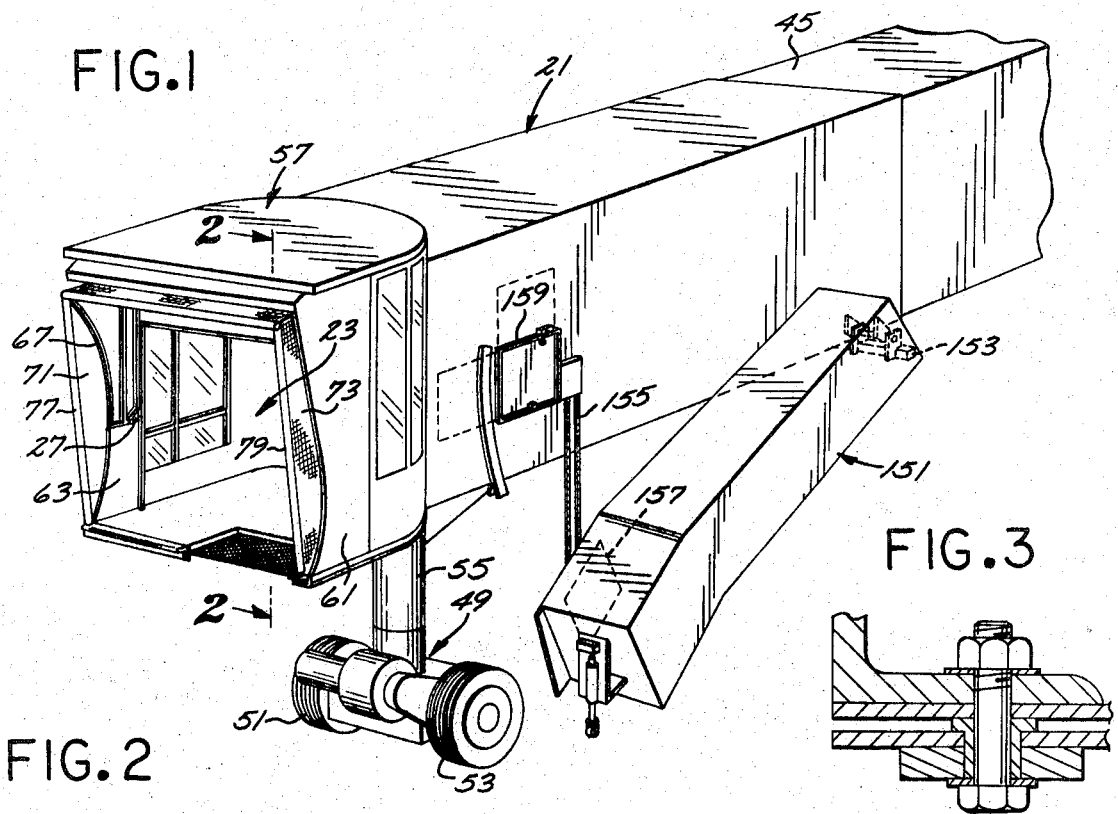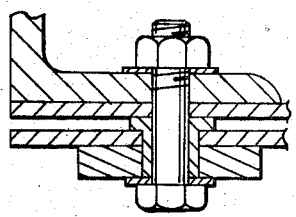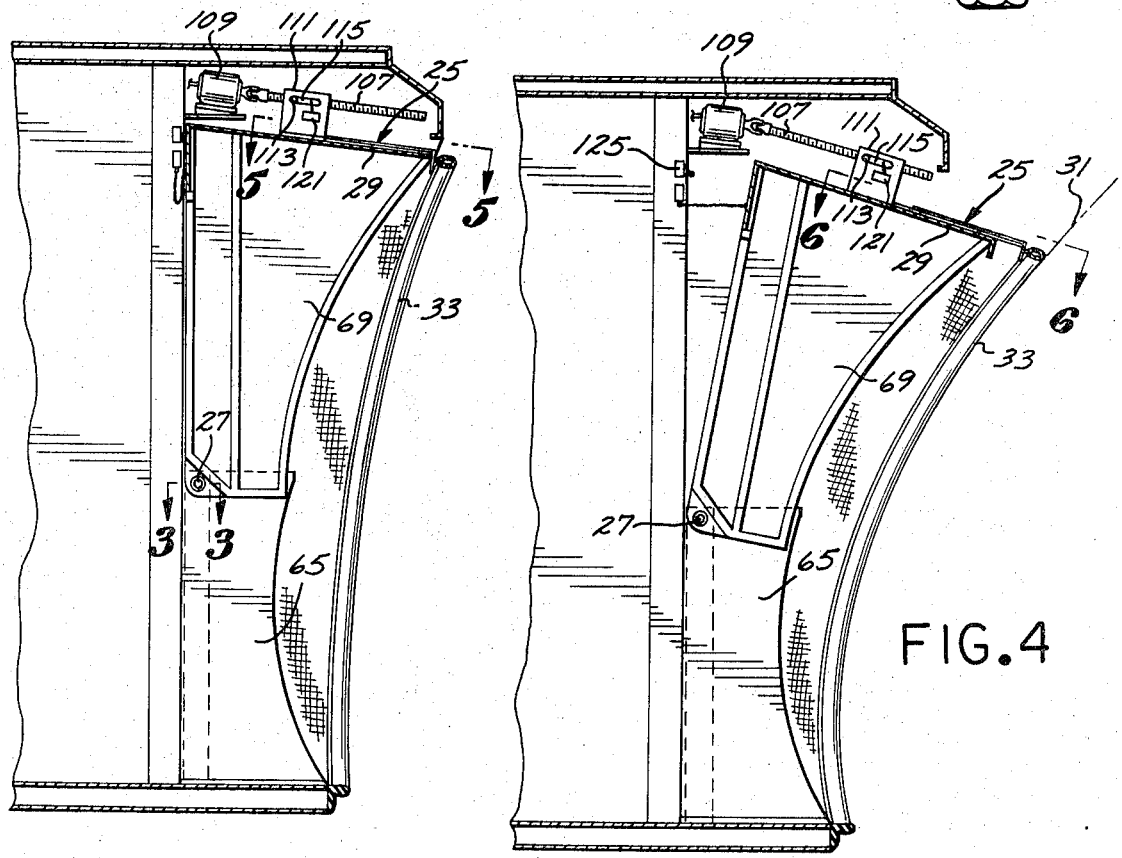

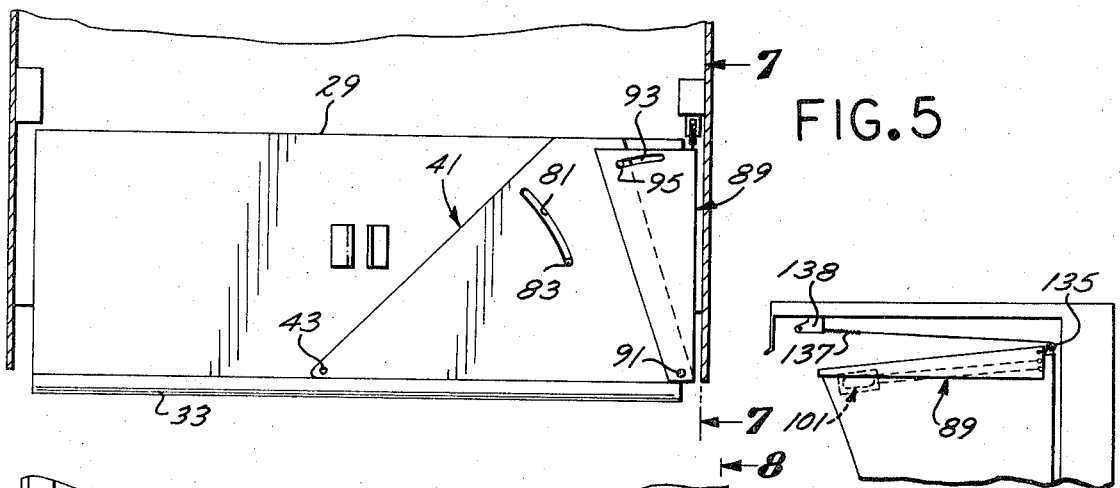
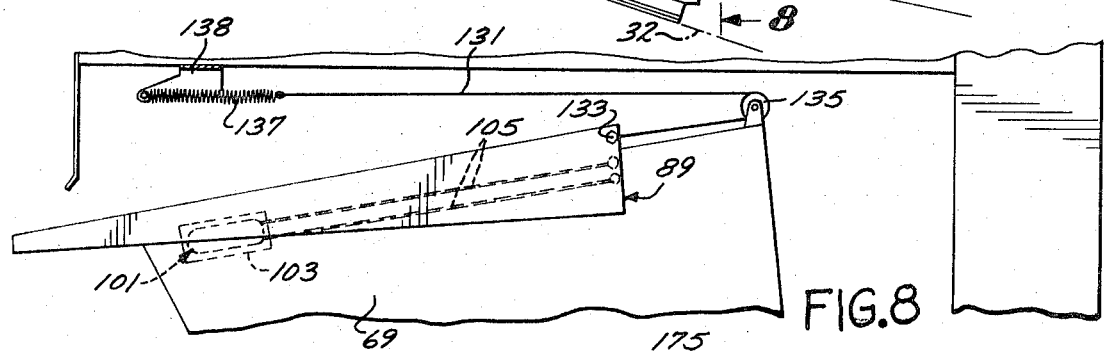

CONTOUR ADAPTED PASSENGER LOADING RAMP

BACKGROUND OF THE INVENTION

1. Field of the Invention

The contour adapted passenger loading ramp of the present invention relates to an extendable tunnel-type ramp leading from an aircraft terminal for mating at its outer extremity with the side of an aircraft fuselage for emplaning and deplaning of passengers from an entry door to such aircraft.

2. Description of the Prior Art

With the advent of present day jumbo jets and the like there is a great demand for facilities to accommodate emplaning and deplaning of passengers from various models of aircraft. Many terminals have employed tunnel-type ramps which mate at their outer extremities with the aircraft fuselage. In this regard, ramps have been proposed with canopies on their open end which pivot forwardly about the horizontal axes to engage the roofs thereof with the fuselage above the entry door. Further, it has been proposed to define the wall ends at the ramp opening by means of shock cords having heavy canvass carried therefrom to thus cause the shock cords to stretch and accommodate the various contours of different aircraft. Further, thick foam rubber and deformable air bags have been proposed to form the desired seal with the aircraft contour. The aforementioned prior art devices all suffer the shortcoming that they are either not sufficiently adaptable to accommodate the relatively large degrees of differences in the various popular models of aircraft presently in use or that the construction thereof is relatively flimsey thus resulting in rapid deterioration under heavy use and inadequate adaption to the various aircraft contours thus leaving large gaps for passage of wind, rain, snow and other inclement conditions.

SUMMARY OF THE INVENTION

The contour adapted passenger loading ramp of the present invention is characterized by a canopy which is selectively shiftable toward the aircraft for engagement of the roof thereof with the fuselage over the entry door area. An adaptor cover is carried from the canopy roof and is shiftable independently of the canopy roof to shift at least one extremity thereof inwardly towards the fuselage to cooperate with the canopy roof in closely fitting the aircraft fuselage contour thus sealing the ramp against entry of wind, rain, and the like.

The objects and advantages of the present invention will become apparent from a consideration of the following detailed description when taken in conjunction with the accompanying drawings.

DESCRIPTION OF THE DRAWINGS

FIG. 1 is a perspective view of a contour adapted passenger loading ramp apparatus embodying the present invention;

FIG. 2 is a vertical sectional view, in enlarged scale, taken along the line 2—2 of FIG. 1;

FIG. 3 is a horizontal sectional view, in enlarged scale, taken along the line 3—3 of FIG. 2;

FIG. 4 is a vertical sectional view, in enlarged scale, taken along the line 2—2 of FIG. 1 and depicting the canopy in its extended position;

FIGS. 5 and 6 are horizontal sectional views, taken along the respective lines 5—5 and 6—6 of FIGS. 2 and 4 respectively;

FIG. 7 is a longitudinal sectional view taken along the line 7—7 of FIG. 5;

FIG. 8 is a longitudinal sectional view taken along the line 8—8 of FIG. 6; and

FIG. 9 is a horizontal sectional view similar to FIG. 5 of a second embodiment of the contour adapted passenger loading ramp apparatus of the present invention.

DESCRIPTION OF THE PREFERRED EMBODIMENTS

Referring to FIGS. 1, 2 and 5, the contour adapted passenger loading ramp apparatus of the present invention includes, generally, a boxed-in tunnel-type ramp 21 forming a walk-way terminating in an access opening 23 surrounded in its upper portion by a canopy 25 carried from pivot pins 27 (FIG. 4) defining a horizontal axis about which such canopy may be rotated to cause its roof 29 to extend for engagement with the fuselage 31 of an airplane 32 or 35 above the entry door 33 thereof. Referring to FIG. 6, it will be appreciated that the relatively large oversized jumbo jets, such as the Boeing-747 35, taper forwardly and inwardly at the forward entry door 33 thereof at a relatively gentle curvature while the smaller Boeing-707 33 and the like taper inwardly more abruptly thus forming a sharper forwardly and inwardly curved curvature. In order to accommodate the differences in fuselage curvature, an adaptor plate, generally designated 41 (FIG. 6) is pivotally mounted from a pivot pin 43 on the canopy roof 29 and has its free extremity adjustable between from a fully retracted position as shown in FIG. 5 to the intermediate broken line position shown in FIG. 6 and the fully extended solid position shown in such FIG. This adaptation to different curvatures provides for close sealing engagement with the contour of the fuselages 32 and 35 to block entry into the access opening 23 of rain, sleet, snow and the like, thus contributing to the confort of passengers emplaning and de-planing through the ramp 21.

It has been common practice to provide a ramp apparatus 21 including a rectangular-in-cross section base tube 45 extending from the air terminal and having ramp 21 telescoped thereover for telescopical extension and retraction therefrom. These ramps are frequently pivotably connected at their base to the terminal to enable swinging thereof through an arc for mating with the entry door of an airplane at a variety of locations within an airplane loading area. The free extremities of such ramps are normally carried from a truck, generally designated 49, having a pair of wheels 51 and 53 which support a vertical post 55 having a rotatable cab, generally designated 57, mounted thereon.

The rotatable cab 57 conventionally incorporates controls for driving the truck 49 to control extension and retraction of the ramp 21 and to control rotation of such cab for optimal alignment in mating with the fuselage contours of various aircraft. Referring to FIGS. 2 and 4, the cab 57 terminates at its open end in an outer somewhat rectangularly-in-cross section shell 61 having an interior liner disposed therein and formed by means of a pair of upstanding lower side wall sections 63 and 65 (FIGS. 1 and 2) having the canopy 25 mounted therefrom. The canopy 25 includes a pair of downwardly projecting side walls 67 and 69 mounted on their lower extremities from the upper extremities of the respective lower side wall portions 63 and 65 by means of the pivot pins 27. The canopy roof 29 spans the space between the upper extremities of the side wall portions 67 and 69 and the front extremities of the respective side wall portions 63, 65, 67 and 69 terminate in an arcuate configuration to generally accommodate the normal cylindrical shape of an airplane fuselage. To further facilitate sealing against the airplane fuselage, weather curtains 71 and 73 line the interior of the opposite side walls of the cab shell 61 and have their respective free extremities turned back around respective vertically extending shock cords to form respective high strength sealing bands 77 and 79.

Referring to FIGS. 5 and 6, the adaptor plate 41 overlies one half of the canopy roof 29 and is generally wedge-shaped with one apex being carried from such roof by means of the pivot pins 43. Such adaptor plate 41 is formed essentially with an arcuate guide slot 81 having a guide pin 83 mounted from the roof 29 projecting thereinto. A resilient bumper 85 lines one half the front edge of the roof 29 and continues over the leading edge of the adaptor plate 41. Carried transversely on the free extremity of the adaptor plate 41 is a wedge-shaped compensating plate 89 having its pointed end carried from the leading extremity of the adaptor plate 41 by means of a pivot pin 91. Such compensating plate 89 tapers rearwardly and outwardly from its leading end and is formed in its rearmost extremity with an arcuate slot 93 having a guide pin 95 carried from the adaptor plate 41 projecting therethrough. Referring to FIGS. 7 and 8, one side of the compensator plate 89 is turned down over the end of the adaptor plate 41 to form a vertically projecting skirt 94.

Referring to FIGS. 5 and 8, the adaptor plate 41 is biased toward its extended position shown in FIG. 6 by means of a sash spring, generally designated 101, and having its housing 103 mounted on the lowered extremity of the canopy side wall 69 and the retractable cables 105 thereof anchored to the rear extremity of the down-turned skirt 94 of the compensator plate 89.

Referring to FIGS. 2, 4 and 6, the canopy 25 is overbalanced to cause the roof portion thereof to be drawn outwardly and downwardly under the influence of gravity and such outward and downward movement is controlled by means of a drive screw 107 projecting from the drive shaft of a drive motor 109. Such drive screw 107 is screwed through a driven coupling carried in a mounting bracket 111 having slider pins 113 projecting from the opposite sides thereof and through elongated slots 115 formed in such bracket. Still referring to FIGS. 2 and 4, disposed adjacent the guide slot 115 is a limit switch 121 which is engaged by the slider pin 113 when the driven coupling reaches the fully extended position shown in FIG. 4 to discontinue energization of such drive motor 109. Rotation in the reverse direction of such drive motor 109 is discontinued by means of a limit switch 125 (FIG. 4) mounted from the ramp structure 21 and engaged by such canopy when it reaches its fully retracted position shown in FIG. 2 to deenergize such motor 109.

Referring back to FIGS. 7 and 8, a tethering cable 131 is secured on one end to the rear extremity of the compensator plate 89 by means of an anchor bolt 133 and projects rearwardly to wrap around a sheave 135 mounted from the rear extremity of the canopy roof 29 by means of a tension spring 137 secured to a mounting bracket 138. Such tethering cable 131 is of sufficient length to apply sufficient tension to the rear extremity of the compensator plate 89 upon full retraction of the canopy 25 to fully retract the free extremity of the adaptor plate 41 and to also provide sufficient slack upon full extension of the canopy 25 to release the free extremity of such adaptor plate 41 for full extension thereof to the position shown in FIG. 6, it being realized that such compensator plate will normally engage the contour of the aircraft 32 or 35 with which the ramp is mated to limit such extension of the adaptor plate 41.

As an optional feature, the ramp apparatus 21 has mounted from one side thereof a baggage chute, generally designated 151 (FIG. 1) and carried pivotally at its rear extremity from a mounting bar 153. The free extremity of such chute 151 is selectively raised and lowered by means of a lifting device 155 and includes a baggage receiving opening 157 which is selectively registerable with a doorway in the side wall of the ramp 21, such doorway being normally covered by means of a door 159.

In operation, an airplane 32 or 35 to receive or discharge passengers is moved into the airplane parking area adjacent a terminal and an operator positioned at the controls of the cab 57 will energize the truck 49 to maneuver such truck about and telescopically extend the ramp 21 to bring the cab 57 adjacent the airplane in the cabin area. After the ramp cab 57 has been positioned sufficiently close to the airplane to engage the floor thereof, the drive motor 108 (FIG. 2) may be energized to rotate the drive screw 107 to enable the top of the canopy 25 to rotate downwardly and outwardly about the pivot pins 27 to engage the seal 33 (FIG. 6) covering the leading edge of the canopy roof 29 with the fuselage. Upon extension of canopy roof 29 the sheave 135 (FIG. 6) will be moved forwardly and downwardly from the position shown in FIG. 7 to the position shown in FIG. 8 to provide sufficient slack in the tethering cable 131 to enable the adaptor plate 41 to rotate forwardly about its pivot pins 43 (FIG. 6) to engage the free edge thereof with the forwardly and inwardly sloped contour of the plane 32 or 35 to provide a close sealing engagement between such adaptor and the plane. Concurrent with forward rotation of the adaptor plate 41, the trailing extremity of the compensator plate 89 will be retracted from the position shown in FIG. 5 to the position shown in FIG. 6, such retraction being limited by engagement of the slider pin 95 with the right hand extremity of the slot 93 as shown in FIG. 6. It is particularly important that the adaptor plate 41 has a sufficient range of travel to accommodate the forwardly and inwardly slope of the fuselage in the cabin area of the modern day passenger jet aircraft, such as Boeing 727's, 737's, 707's, 747's, Douglas DC-8's, DC-9's, and DC-10's and the like.

It will be appreciated that any late boarding passengers not have sufficient time to check their baggage at the baggage check counter, may carry his baggage into the ramp 21 or have it carried there by flight attendants and such luggage may be deposited into the raised luggage chute 151 for subsequent loading in the baggage compartment of the airplane. As the aircraft is readied for flight, the chute 151 may be lowered to the position shown in FIG. 1 and the baggage removed therefrom for deposit in the baggage compartment. This feature is particularly important with the modern day security precautions requiring thorough searching of all baggage carried to the passenger compartment of the airplane.

After the emplaning or deplaning procedure has been completed, the cab operator can energize the drive motor 109 (FIG. 4) in the reverse direction to draw the roof of the canopy 25 rearwardly to the position shown in FIG. 2, at which point the rear extremity of such canopy will engage the limit switch 125 to de-energize the drive motor. The cab operator may then manipulate the cab controls to telescopically retract the ramp 21 to free the airplane for departure from the parking area.

The embodiment of the contour adapted passenger loading ramp apparatus disclosed in FIG. 9 is similar to that shown in FIG. 1 and has proven to be the more popular version. The apparatus of FIG. 9 includes, generally, a canopy 171 similar to the canopy 25 and carried from a cab 173. Pivotally mounted to the roof 175 of the cab 173 is an adaptor plate 176 carried centrally from a pivot pin 177 projecting from such roof. The leading extremity of the adaptor plate 176 is covered with a highly resilient bumper 179 and the plate itself is balanced to be normally disposed in the position shown but may be rotated on the pivot pin 177 when one end or the other of such plate is contacted with the aircraft fuselage.

Thus, during operation, the cab 173 may be brought adjacent the aircraft fuselage as described hereinabove with respect to the cab 57 and when the canopy 171 is extended, one end of the adaptor plate 176 will first engage the aircraft fuselage thus causing the plate to rotate on the pivot pin 177 to an alignment generally corresponding with the curvature of the aircraft, the bumper 179 having sufficient resiliency to avoid damage to the aircraft and to flex sufficiently to facilitate adaption to the fuselage contour.

In view of the foregoing it will be apparent that the contour adapted passenger loading ramp apparatus of the present invention provides a particularly convenient and sturdy aircraft loading ramp which will accommodate numerous different models of aircraft while providing for a relatively positive seal against entry of rain, snow, wind and the like thus contributing to the comfort of the passengers during their emplaning and deplaning procedures.

Various modifications and changes may be made with regard to the foregoing detailed description without departing from the spirit of the invention.

I claim:

1. Contour adapted passenger loading ramp apparatus for accommodating the contour of a plurality of different aircraft and comprising:
    a covered ramp formed with a walk-way terminating at one end in a plane-mating access opening;
    canopy means carried from said walk-way and including a roof having a leading and trailing edge, said roof being shiftable toward and away from said aircraft;
    an elongated contour adaptor plate disposed over one extremity of said roof and pivotally connected to one extremity to the intermediate portion of said roof, the free extremity of said adaptor plate being shiftable toward and away from said aircraft relative to said leading edge; and
    a tangential adjustment plate overlying the free extremity of said adjustment plate and having one end pivotally connected to the leading edge of said adaptor plate whereby said access opening may be mated with the entry doors of different selected ones of said aircraft and said canopy roof shifted toward said aircraft and the free end of said adaptor plate shifted further toward said aircraft while the free end of said adjustment plate is pivoted outwardly to maintain said canopy covered.

2. Contour adapted passenger loading ramp apparatus according to claim 1 wherein:
    said roof is shiftable toward and away from said aircraft independently of said ramp; and
    said apparatus includes screw means connected between said ramp and roof, motor means for driving said screw means, and cable means connected between said adaptor plate and said ramp and operative in response to retraction of said roof to retract said adaptor plate.

3. Contour adapted passenger loading ramp apparatus as set forth in claim 1 that includes:
    an electrical retraction motor connected with said canopy and electrical control circuit means for controlling said motor and including control switch means disposed at the opposite ends of the path of travel of said canopy and operative upon engagement thereof by said canopy to de-energize said motor.

4. Contour adapted passenger loading ramp apparatus according to claim 1 wherein:
    said adaptor plate is wedge-shaped and has one apex thereof pivotally connected to said roof and includes limit means for limiting travel of the free extremity thereof;
    said adjustment plate is wedge-shaped and has one apex pivotally connected to said adaptor plate, said adjustment plate further including limit means limiting travel of the free extremity of said adjustment plate; and
    adaptor plate retraction means including a pulley mounted on the trailing edge of said roof, support means projecting from said canopy and over said adaptor plate and cable means connected on one end with the projecting extremity of said support means extending around said pulley and connected on its opposite end with said adaptor plate.

5. Contour adapted passenger loading ramp apparatus as set forth in claim 1 that includes:
    stop means for limiting travel in the opposite directions of said adaptor plate.

6. Contour adapted passenger loading ramp apparatus as set forth in claim 1 that includes:
    retraction means connected between said roof and ramp and operative to control extension and retraction of said canopy; and
    tethering means connected between said ramp and adaptor plate and operative in response to retraction of said canopy to retract said adaptor plate.

7. Contour adapted passenger loading ramp apparatus as set forth in claim 1 wherein:
    said canopy roof slopes downwardly and forwardly;
    said adpator plate is carried pivotally from said roof and is balanced to normally assume said retracted position; and
    bumper means covering the leading edge of said adaptor plate.

* * * * *